United States Patent [19]
Murayama

[11] Patent Number: 5,636,314
[45] Date of Patent: Jun. 3, 1997

[54] IMAGE DATA FILING APPARATUS

[75] Inventor: Takashi Murayama, Gifu, Japan

[73] Assignee: Sanyo Electric Co., Ltd., Osaka-fu, Japan

[21] Appl. No.: 335,668

[22] Filed: Nov. 8, 1994

Related U.S. Application Data

[63] Continuation of Ser. No. 83,380, Jun. 28, 1993, abandoned, which is a continuation of Ser. No. 400,478, Aug. 30, 1989, abandoned.

[30] Foreign Application Priority Data

| Sep. 7, 1988 | [JP] | Japan | 63-224034 |
| Sep. 9, 1988 | [JP] | Japan | 63-226758 |
| Sep. 13, 1988 | [JP] | Japan | 63-229451 |

[51] Int. Cl.$^6$ .................................................. H04N 5/76
[52] U.S. Cl. ........................................... 386/46; 386/92
[58] Field of Search .................................. 358/335, 342, 358/311; 360/15, 35.1, 33.1, 91, 98.1, 78.03, 98.04, 98.03; 369/32, 34, 36; 386/46, 52, 66, 92, 106; H04N 5/76

[56] References Cited

U.S. PATENT DOCUMENTS

| 4,408,181 | 10/1983 | Nakayama | 364/900 |
| 4,538,176 | 8/1985 | Nakajima et al. | 358/903 |
| 4,573,084 | 2/1986 | Iida | 360/35.1 |
| 4,607,290 | 8/1986 | Murakami | 358/342 |
| 4,616,319 | 10/1986 | Peters et al. | 358/903 |
| 4,660,101 | 4/1987 | Martin | 358/342 |
| 4,717,971 | 1/1988 | Sawyer | 369/34 |
| 4,796,099 | 1/1989 | Compton | 358/342 |
| 4,817,050 | 3/1989 | Komatsu et al. | |
| 5,216,552 | 6/1993 | Dunlap et al. | 360/15 |

FOREIGN PATENT DOCUMENTS

| 01110676 | 6/1984 | European Pat. Off. |
| 8601667 | 3/1986 | WIPO |

OTHER PUBLICATIONS

Ito et al., "Hitachi Optical Disk File System HITFILE 60," Hitachi Review, pp. 63–68, vol. 35, No. 2, Apr. 1986, Tokyo, Japan.

Primary Examiner—Thai Tran
Assistant Examiner—Huy Nguyen
Attorney, Agent, or Firm—Darby & Darby

[57] ABSTRACT

An image data filing apparatus is provided with a main device which records and/or reproduces image data with respect to the recording medium being set therein, a terminal device which is connected to the main device by communication line and which records and/or reproduces image data with respect to the recording medium in the main device, a plurality of buffer memories for temporarily storing the image data to be recorded to the recording medium or the image data reproduced from the recording medium, and control device which performs a multi-processing of recording operation or reproducing operation of the buffer memories. When a request from the main device and a request from the terminal device are simultaneously generated, according to those requests, the multi-processing is performed by the control device, as a result, those requests can simultaneously be processed.

8 Claims, 12 Drawing Sheets

Fig. 5

```
OPTICAL DISK LIST
  1. OPTICAL DISK No.1
  2. OPTICAL DISK No.2
  3. NEWSPAPER CLIPPING
  4. IMAGE DATA FILLING APPARATUS    TECHNOLOGY MATERIALS
  5. IMAGE DATA FILLING APPARATUS    MARKET TENDENCY
  6.
  7.
  8.
  9.
 10.
 11.
 12.
 13.
 14.
 15.
 16.
 17.
 18.
 19.
 20.
```

| PERFORMANCE | CANCELLATION |

Fig. 6

```
[REGISTER]
  OPTICAL DISK:NEWSPAPER CLIPPING
  TITLE  \    :
  DATE        :
  KEY WORD 1  :
  KEY WORD 2  :
```

| PERFORMANCE | CANCELLATION |

IMAGE DATA FILING APPARATUS

This is a continuation of application Ser. No. 8/083,380, filed Jun. 28, 1993 abandoned, which is continuation of 7/400,478 filed Aug. 30, 1989, now abandoned.

BACKGROUND OF THE INVENTION

1. Field of the Invention

The present invention relates to an image data filing apparatus which records image data in recording media and retrieves/reproduces it when necessary, and more particularly, to an image data filing apparatus which communicates with other image data filing apparatus such as a terminal device connected thereto by communication line.

2. Description of Related Art

With increase in data and with rationalization of business management, there has been developed an image data filing apparatus which records image data of a large number of documents in such recording medium with mass storage as an optical disk and reproduces this recorded image data by a main device including this recording medium and which further can reproduce the image data recorded in the recording medium through communication line from a terminal device comprising a CRT display or a printer and an input device such as a keyboard, or also from a terminal device having the similar functions as the main device.

This image data filing apparatus has made such advantages as that plural users can deal with image data and that users distant from the main device can deal with image data by using such a terminal device.

When the number of optical disks is increased in order to record a lot of image data, there appears such an image data filing apparatus as is provided with plural sets of optical disk devices therein, wherein each optical disk is adapted to be set in each optical disk device, thereby, a user can always have a prompt response to his request for retrieval.

When the number of optical disks, however, is more increased, it is difficult to provide in the image data filing apparatus the same number of costly optical disk devices as that of the increased optical disks to be filed therein. And when a user retrieves/reproduces and records image data with respect to an optical disk which is not being set in the optical disk device, he himself must set the required optical disk in the optical disk device, which results in such disadvantages as that functional operations of the image data filing apparatus can not effectively be performed and that filing of the optical disks becomes complicated. As a result, those disadvantages greatly prevent the image data filing apparatus from effectively being used.

A solution to the above-mentioned disadvantages is disclosed such as in Japanese Patent Application Laid-Open No. 220167/1986, wherein there has been developed an image data filing apparatus which can readily file plural optical disks by connecting thereto an auto-disk-changer incorporating the optical disk device as a recording/reproducing unit. Saving the user's trouble to set optical disks therein by himself, the image data filing apparatus is more effectively used.

In an image data filing apparatus having the auto-disk-changer incorporating the recording/reproducing unit therein and capable of reproducing the image data recorded in recording media such as optical disks stacked in the auto-disk-changer from the other image data filing apparatus through a communication line, there is a possibility that a request for reproduction (or for record) by the user of the main device will simultaneously be generated with a request for reproduction (or for record) by the user of the terminal device. In this case, if the apparatus can perform processing by only either of those devices, the user of the other device must wait until the previous processing is finished, which disadvantage also results in preventing the image data filing apparatus from effectively being used.

Further in such an image data filing apparatus having the auto-disk-changer as described above, compared to other image data filing apparatus, it takes longer time for setting the optical disk in the recording/reproducing unit and for removing the optical disk from it, unless the setting condition of the optical disk in the recording/reproducing unit and the stack condition of the optical disk in the auto-disk-changer are precisely filed. This significantly decreases the efficiency of the apparatus.

SUMMARY OF THE INVENTION

The foregoing disadvantages are overcome in accordance with the present invention.

The image data filing apparatus of the invention is provided with a main device which records and/or reproduces image data with respect to a recording medium detachably set therein, a terminal device which is connected to the main device via communication means and which records and/or reproduces image data with respect to the recording medium in the main device, plural buffer memories for temporarily storing the image data to be recorded in the recording medium or the image data reproduced from the recording medium, and control means which performs a multi-processing of recording or reproducing operation of the buffer memories in response to a request for record or for reproduction from both the main device and the terminal device so as to simultaneously control those operations in response to those requests.

In the image data filing apparatus of the invention, when a request for record or for reproduction from a user of the main device is generated simultaneously with another request for record or for reproduction from a user of the terminal device, those requests are handled simultaneously by the control means which performs a multi-processing with respect to those requests from the both devices by each recording operation unit from one buffer memory or by each reproducing operation unit to one buffer memory.

Further, in the image data filing apparatus of the invention, there is employed in the main device such a recording/reproducing means as of auto-changer type, that is, the means having an auto-disk-changer provided with a stack unit for stacking plural recording media, recording/reproducing units for recording and reproducing image data with respect to the recording medium being set therein, and a carrier unit for carrying the recording medium between the stack unit and the recording/reproducing units.

In another embodiment of the invention, there is employed in the main device such a recording/reproducing means of auto-changer type as described above, wherein one recording medium is adapted to be automatically returned to the stack unit from the recording/reproducing unit by the carrier unit, after the predetermined time has passed since a recording operation or reproducing operation with respect to the recording medium was finished.

In a further embodiment of the invention, there is employed in the main device such a recording/reproducing means of auto-changer type as described above, wherein the stack condition of the recording media in the stack unit, the setting condition of the recording medium in the recording/ reproducing unit, and such a recording/reproducing unit as having most formerly performed access operation with respect to a recording medium being set therein are filed.

It is an object of the invention to provide an image data filing apparatus which can simultaneously perform such handling with respect to both requests from the main device and the terminal device that effective operation of the apparatus can be obtained.

It is another object of the invention to provide an image data filing apparatus in which a user of the apparatus is not liable to wait for another processing requested by another user to be finished.

It is a further object of the invention to provide an image data filing apparatus which can realize prompter response to a user's request by having such constitution as described above.

The above and further objects and features of the invention will more fully be apparent from the following detailed description with accompanying drawings.

BRIEF DESCRIPTION OF THE DRAWINGS

FIGS. 5 and 6 are schematic views of display screens of a CRT display;

DESCRIPTION OF THE PREFERRED EMBODIMENTS

Figure 1:
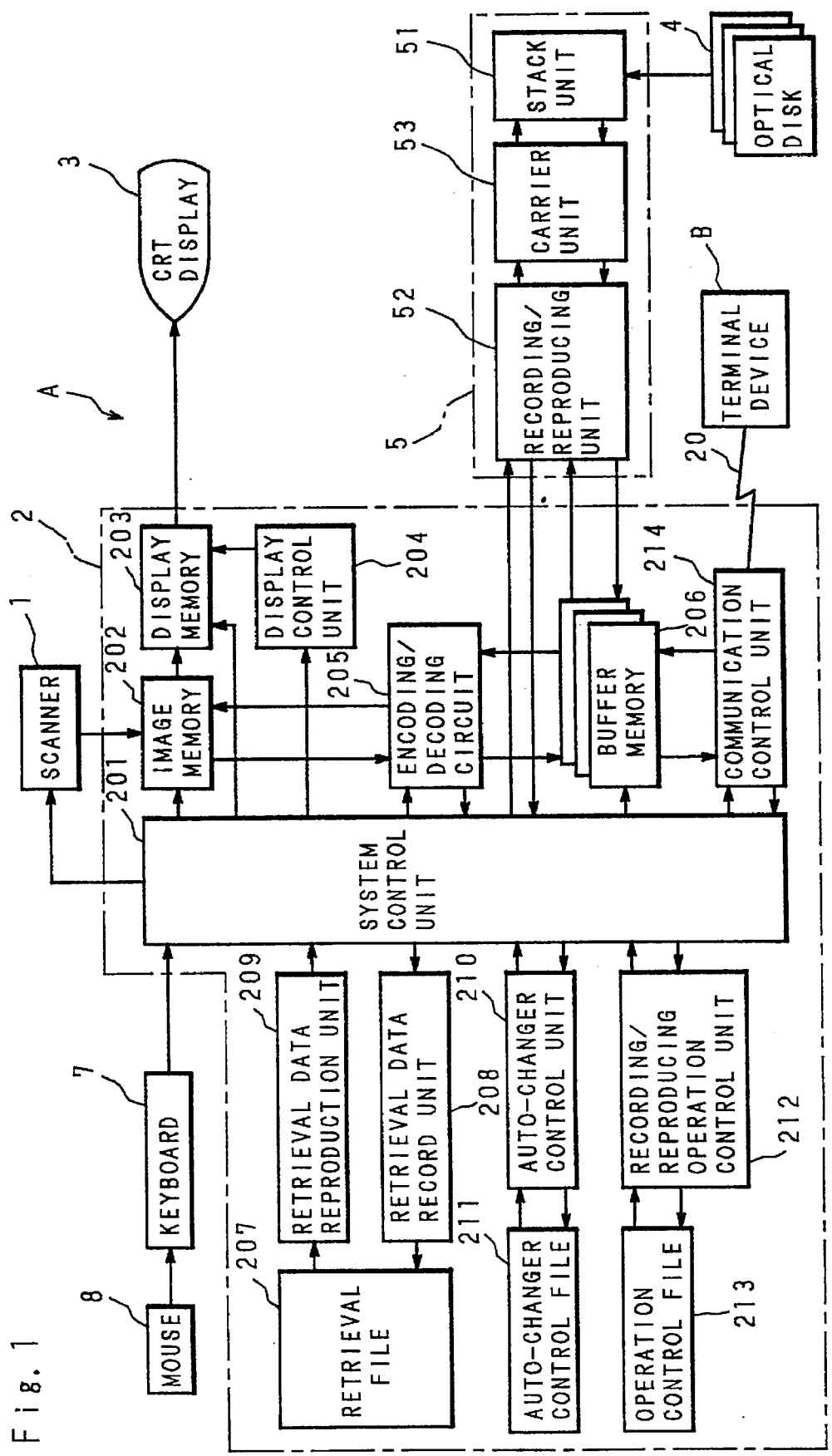
FIG. 1 is a block diagram showing the whole configuration of an image data filing apparatus in accordance with the invention.

In FIG. 1, reference character A designates a main device which is composed of a main control unit 2 for controlling the image data filing apparatus and such each member connected to the main control unit 2 as will be described below. Such members connected to the main control unit 2 are as follows: a scanner 1 as an image reading device which optically scans to read originals of image data such as documents to be recorded in the image data filing apparatus and which then converts it in the form of dot data so as to be outputted, a keyboard 7 which is provided with a mouse 8 as a pointing device and which inputs both the retrieval data such as title and key word and the input data such as various kinds of control signals, a CRT display 3 for displaying the image data, and an auto-disk-changer 5 whose mechanism is well known for its automatic setting of optical disks 4 into the recording/reproducing units 52, provided with plural recording/reproducing units 52 as an optical disk device, a stack unit 51 for stacking plural optical disks 4 to be removable in plural shell-form portions divided with each other, and a carrier unit 53 for carrying the optical disks 4 between the recording/reproducing units 52 and the stack unit 51. Carrying operation of the carrier unit 53 includes a taking-out, a reversing, a stacking and a conveying of optical disks 4. The optical disks 4 are write-once type for example, however, which are not limited to that, and magnetic disks may be used if detachable. Furthermore, the main device A is connected to a terminal device B by communication line 20.

The main control unit 2 is preferably composed of members as follows: a system control unit 201 which simultaneously controls the plural register processings and retrieval/reading-out processings by undertaking time sharing, an image memory 202 which is controlled by the system control unit 201 and which temporarily stores such image data in one page as inputted from the scanner 1 or the image data of the optical disk 4 after decode processing by an encoding/decoding circuit 205, a display memory 203 which receives the image data stored in the image memory 202 and which temporarily stores the image data to be displayed on the CRT display 3, a display control unit 204 for controlling the display of the image data on the CRT display 3, the encoding/decoding circuit 205 which performs an encode processing such as MH coding and MR coding to the image data sent from the image memory 202 and which performs a decode processing to the data sent from each buffer memory 206, a plurality of buffer memories 206 each of which receives both the encoded data from the encoding/decoding circuit 205 and the encoded data reproduced from the optical disk 4 and which temporarily stores them while operating itself as a buffer for communication, a retrieval file 207 which receives recording start address, recorded data length of encoded data, attribute data such as size and resolution of image data of optical disk 4, and the retrieval data such as title and key word given with respect to the image data by a user and which then files them as retrieval data, a retrieval data record unit 208 and a retrieval data reproduction unit 209 for performing recording/reproducing operation with respect to the retrieval file 207, an auto-changer control unit 210 for controlling both the stack condition of optical disk 4 in the stack unit 51 and the setting condition of the optical disks 4 in the recording/reproducing unit 52 in the auto-disk-changer 5, an auto-changer control file 211 for filing such conditions as referred to above, a recording/reproducing operation control unit 212 which controls whether the recording/reproducing unit 52 in the auto-disk-changer 5 is performing a recording/reproducing operation with respect to the optical disk 4 being set therein or not and whether the optical disk 4 is being carried between the stack unit 51 and the recording/reproducing unit 52 by the carrier unit 53 or not, an operation control file 213 for filing such conditions of controlling the operations as described above, and a communication control unit 214 for controlling such communication with the terminal device B as performed through communication line 20.

Figure 2:
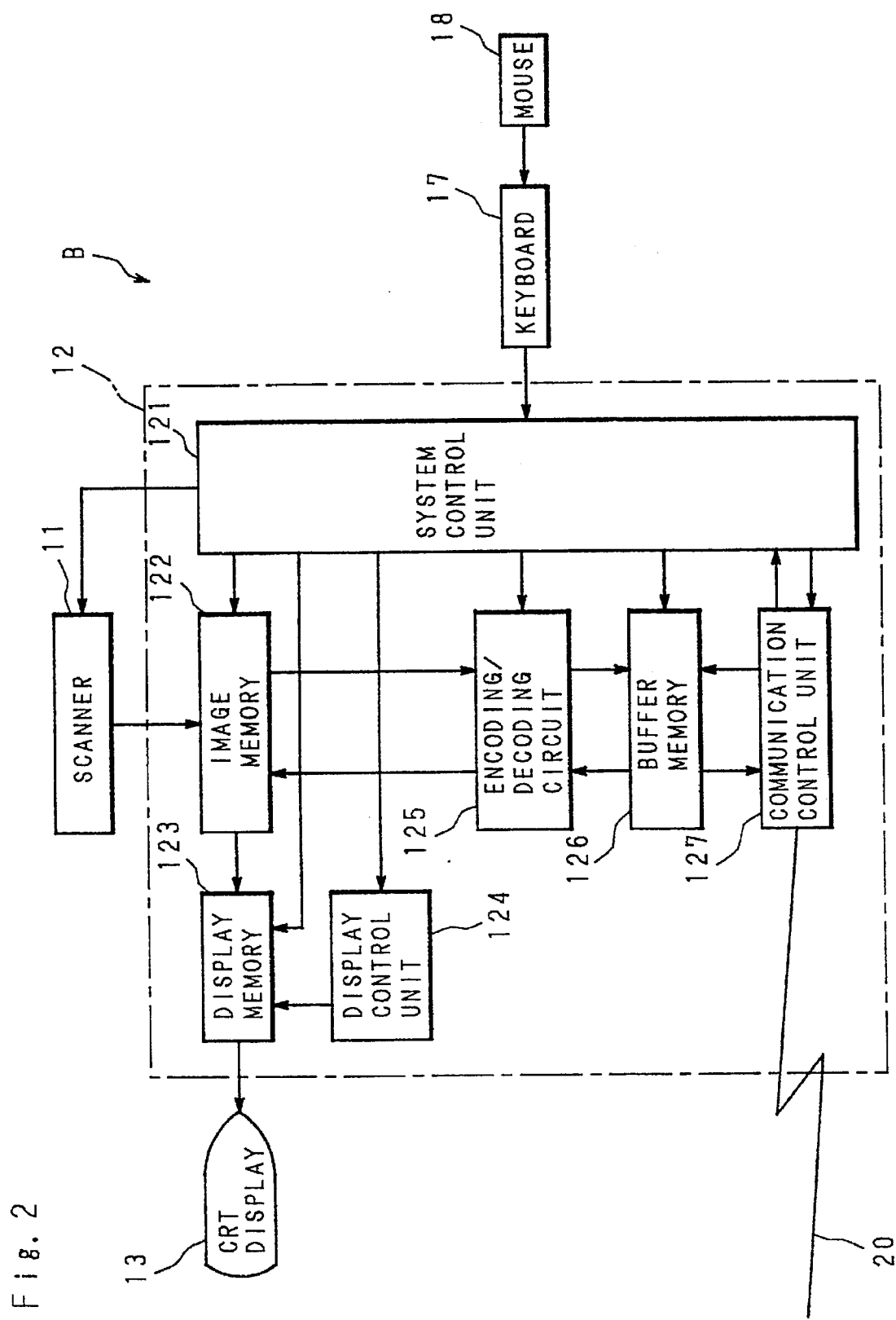
FIG. 2 is a block diagram showing the configuration of a terminal device connected to a main device by communication line.

FIG. 2 is a block diagram showing the configuration of the terminal device B. The terminal device B is preferably composed of a terminal control unit 12 for controlling the terminal device B and components connected to the terminal control unit 12 as follows: a scanner 11 as an image reading device which optically scans to read originals of image data such as documents to be recorded in the image data filing apparatus and which then converts it in the form of dot data so as to be outputted, a keyboard 17 which is provided with a mouse 18 as a pointing device and which inputs both the retrieval data such as title and key word and the input data such as various kinds of control signals, and a CRT display 13 for displaying the image data.

The terminal control unit 12 is preferably composed of components as follows: a system control unit 121 for performing various controls, an image memory 122 which is controlled by the system control unit 121 and which temporarily stores such image data in one page as inputted from the scanner 11 or the image data of the optical disk 4 after decode processing by an encoding/decoding circuit 125, a display memory 123 which receives the image data stored in the image memory 122 and which temporarily stores the image data to be displayed on the CRT display 13, a display control unit 124 for controlling the display of the image data displayed on the CRT display 13, the encoding/decoding circuit 125 which performs an encode processing to the image data sent from the image memory 122 and a decode processing to the data sent from buffer memories 126, the buffer memories 126 each of which temporarily stores the encoded data sent from the encoding/decoding circuit 125 while operating itself as a buffer for communication, and a communication control unit 127 for controlling such communication with the main device A as performed through the communication line 20.

Figure 3:
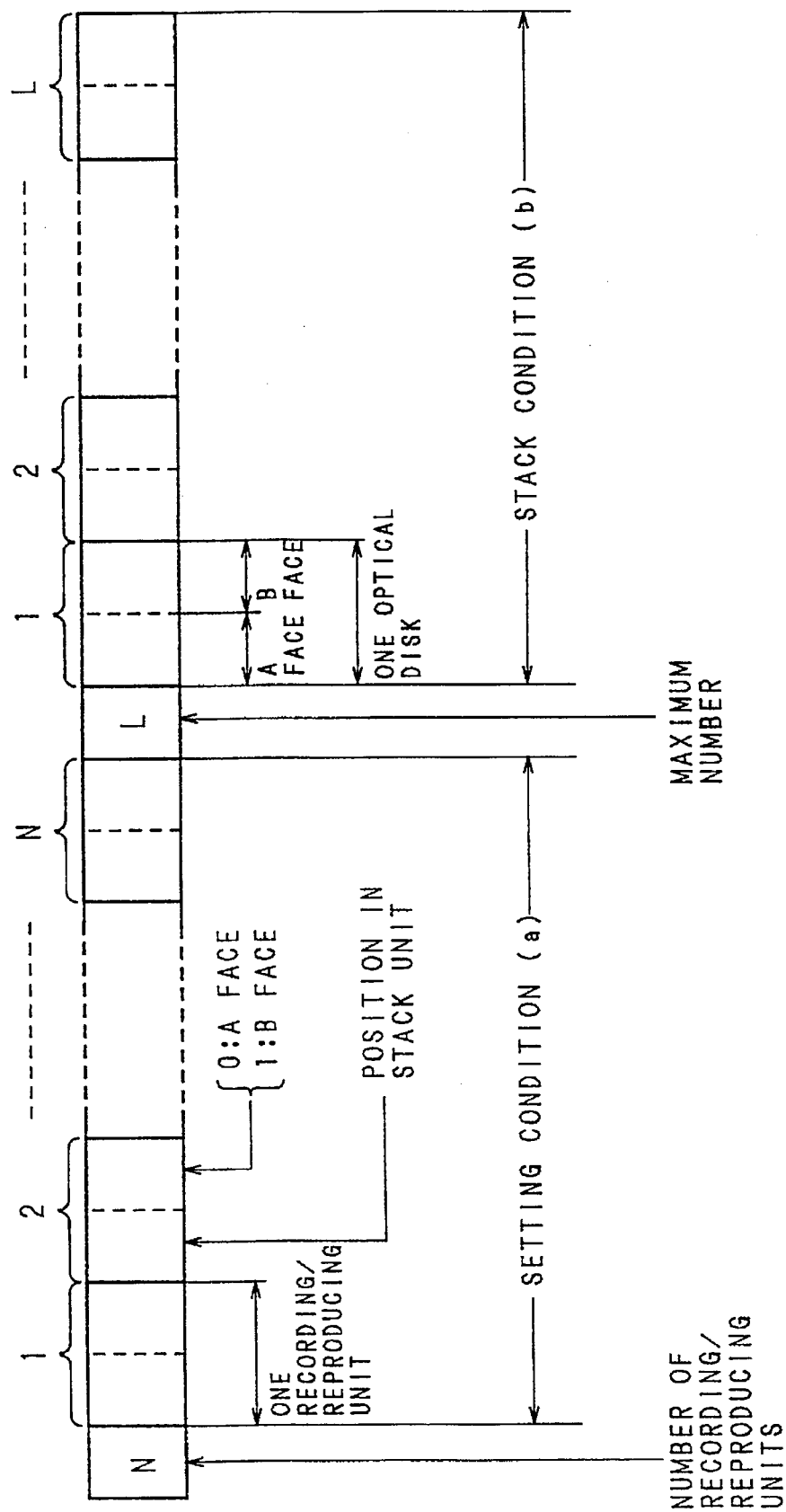
FIG. 3 is a schematic view showing a format of an auto-changer control file.

FIG. 3 is a schematic view showing a format of the auto-changer control file 211. In the auto-changer control file 211, there are filed, in this order, the number (N) of recording/reproducing units 52, data (a) composed of two bytes which shows whether optical disk 4 is being set or not in each recording/reproducing unit 52, the number (L) of optical disks capable of being stacked in stack unit 51, and data (b) composed of two bytes which shows the stack condition in plural portions in stack unit 51. If the optical disk 4 is not being set, the setting-condition data (a) is shown as "0" in both two bytes, and on the contrary, if the optical disk 4 is being set, the position (1~L) of stack unit 51 in which the optical disk 4 in setting has been stacked is stored in the first byte and such data as showing either face of the set optical disk capable of being recorded/reproduced is stored in the second byte. Referring to the stack-condition data (b), one byte is corresponding to either face of the optical disk 4 and so does consecutive two bytes to one sheet (in the order from A face to B face) of the optical disk 4, and those data of two bytes in sheets capable of being stacked are stored in the order of corresponding positions thereto in the stack unit 51. If the optical disk 4 is not being stacked in the stack unit 51, "0" is stored in each byte, and if the optical disk 4 is stacked, optical-disk-filing number (number shown in FIG. 5 which will be mentioned later) with respect to the face of this optical disk 4 is stored. However, even if the optical disk 4 removed from the stack unit 51 is being set in the recording/reproducing unit 52, the number is adapted to be maintained (not to be "0").

Figure 4:
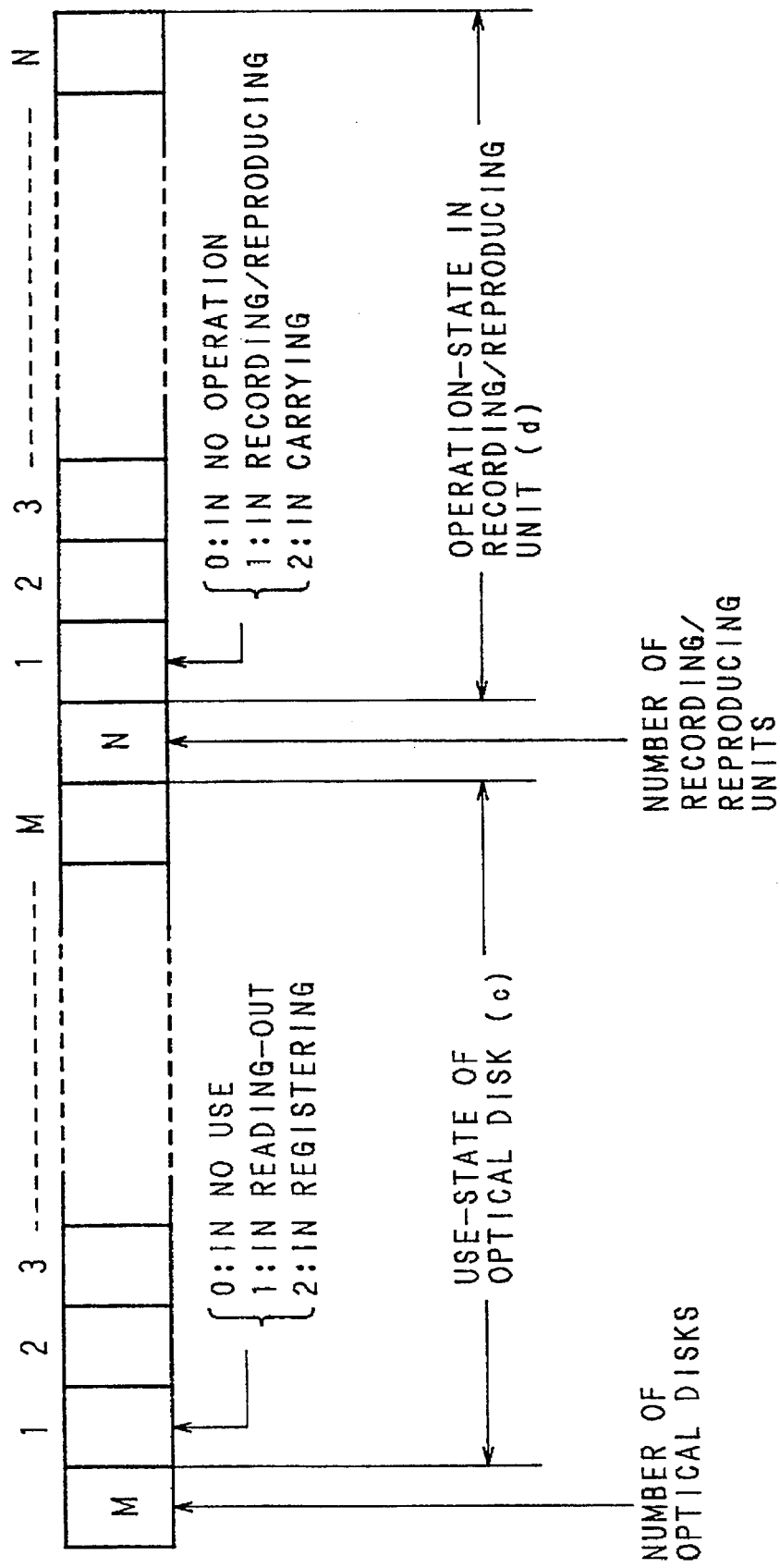
FIG. 4 is a schematic view showing a format of an operation control file.
Figure 7:
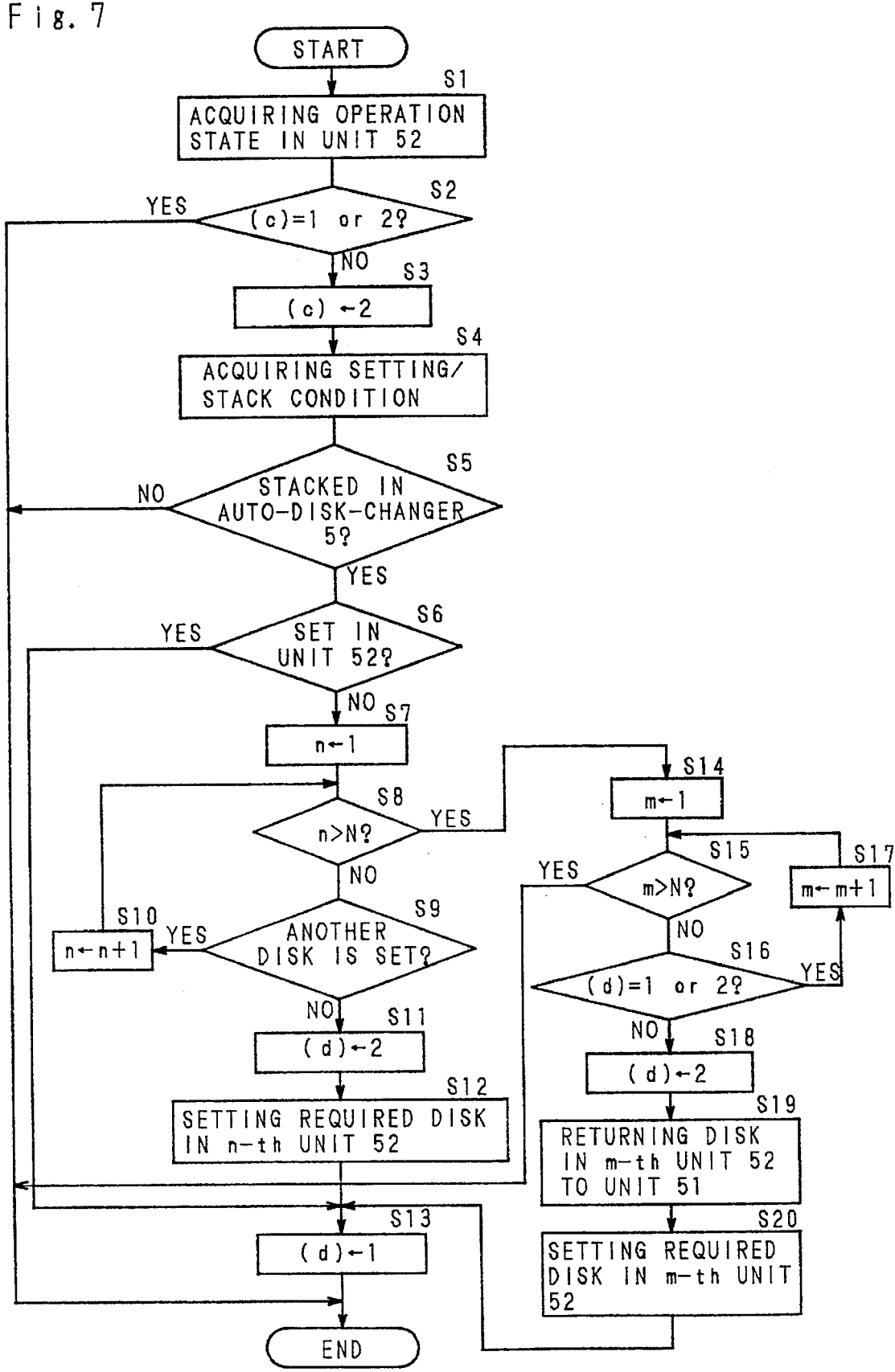
FIG. 7 is a flow chart showing procedure of setting the specified optical disk in a recording/reproducing unit in an auto-disk-changer.

FIG. 4 is a schematic view showing a format of the operation control file 213. In the operation control file 213, the number (M) of optical disks and use-state data (c) showing the condition whether each optical disk is being used or not are filed in the order of optical-disk-filing number, and the number (N) of recording/reproducing units 52 and operation-state data (d) showing the operation-condition of each recording/reproducing unit 52 are filed in the order of the number of recording/reproducing units. Data (c) shows whether each optical disk 4 is being registered, or being read out or not, and data (d) shows whether an optical disk is being recorded/reproduced in each recording/reproducing unit 52 or being conveyed to each recording/reproducing unit 52. The files 211, 213 file two conditions (states) respectively, but it also may be constructed such that one file files one condition (state). At this time, recording designates only processing in which image data in the buffer memory is read-out to be written in the optical disk, register processing includes processings before and after recording, that is, includes a series of processings, with an execution order preferably including—selecting optical disk—inputting retrieval—data—processing as shown in FIG. 7—recording—recording start address, retrieval data and the like to the retrieval file. And, reproduction designates only processing in which image data in the optical disk is read-out to be written in the buffer memory, reading-out processing includes a series of processings, execution order—similar processing as shown in FIG. 7—reading-out address and the like from the retrieval file—reproduction—decode processing.

Now functional operation of such image data filing apparatus of the invention as having aforementioned constitution will be described below.

First, register processing of image data in the main device A is referred to below. Having inputted the image data to be recorded to the image memory 202 by the scanner 1, a user specifies to start register processing of the image data by operating the keyboard 7, and then the system control unit 201 displays in the CRT display 3 such a list of the optical disk 4 filed in the image data filing apparatus of the invention as shown in FIG. 5. The user, then, specifies the optical disk 4 for recording the image data from the displayed list by operating the mouse 8 (to move mouse-cursor for clicking) or ten key of keyboard 7 (to hit one of its numeric keys corresponding to the filing number of the required disk). The system control unit 201, then, displays such retrieval-data-input screen as shown in FIG. 6 in the CRT display 3. The user, next, inputs the retrieval data such as title and key word with respect to the image data he is going to record by using the keyboard 7, and having inputted all the retrieval data, he specifies to execute register by the keyboard 7.

FIG. 7 is a flow chart showing the procedure of from the step after register execution step to the step before recording operation step.

When the execution of register is specified, the system control unit 201 first receives both the condition whether the required optical disk is being used or not and the operation-condition of recording/reproducing units 52 from the operation control file 213 through the recording/reproducing operation control unit 212 (Step S1). At this time, unless the use-state (c) of optical disk is in no use (=0) (Step S2:YES), register processing is finished, which fact being displayed on the CRT display 3 so as to show it to the user. If the required optical disk is in not being used (FIG. 4(c) =0), having set the use-state (c) to be in registering (=2) (Step S3), the system control unit 201 receives both the setting condition of optical disk in recording/reproducing unit 52 and the stack condition of optical disk in stack unit 51 from the setting data (a) and the stack data (b) of the auto-changer control file 211 through the auto-changer control unit 210 (Step S4).

The system unit 201, then, checks whether the required optical disk is in the auto-disk-changer 5 or not from the stack data (b) (Step S5), and if not, register processing is finished, which fact being displayed on the CRT display 3. On the contrary, if the required optical disk is therein (Step S5:YES), it is checked whether the required optical disk is being set in recording/reproducing unit 52 or not according to the setting data (a) (Step S6). If it is set therein (Step S6:YES), the operation-state (d) is set to be in recording/ reproducing (=1) (Step S13) and such recording operation of image data as will be referred to later is processed.

If the required optical disk is not being set (Step S6:NO), all the recording/reproducing units 52 are checked one by one in order to know whether there is any recording/reproducing unit 52 having no optical disk 4 therein or not by the process of Steps S7~S10, and if there is, next processing is proceeded to Steps S11~S12, and if not, processing proceeds to Steps S14~S20. In the Steps S11~S12, the operation-state (d) is set to be in carrying (=2) first and then the required optical disk is sent from the stack unit 51 by operation of the carrier unit 52 so as to be set in the recording/reproducing unit 52 having no optical disk 4 therein. In Steps S14~S20, having checked the recording/reproducing unit 52 whose operation-state (d) is in no use (=0) (Steps S14~S17), and if there is any recording/reproducing unit 52 not being operated, the operation-state (d) is made to be in carrying (=2), and the optical disk 4 set in the recording/reproducing unit 52 not being operated is returned to the stack unit 51 by the carrier unit 53, and then the required optical disk is sent from the stack unit 51 to this recording/reproducing unit 52 by the carrier unit 53 (Steps S18~S20). The portion of the stack unit 51 in which the optical disk 4 is returned can be acknowledged according to the setting condition data (a) of auto-changer control file 211.

Having performed processings of such Steps S12 and S20 as described above, the operation-state (d) is made to be in recording/reproducing (=1) so as to proceed to such recording operation of the image data as will be referred to later.

In addition, if there is no recording/reproducing unit 52 not being operated in Steps S14~S17, the register processing is finished, which fact being displayed on the CRT display 3. Obviously seen in Steps S16~S20, unless the operation-state (d) is in no operation (=0), the optical disk in recording/reproducing state is prevented from a carrying operation. Because the operation-state (d) is renewed page after page of image data as described below, a carrying operation can not be performed on the optical disk in the middle of recording/reproducing of image data in one page. Image data significant in page units aren't recorded/reproduced in small pieces.

Now recording operation of the image data will be described below.

Having performed such processing as shown in FIG. 7, the system control unit 201 specifies a start of compression encoding processing of image data with respect to the encoding/decoding circuit 205, and at this time, the system control unit 201 also specifies address of the buffer memory 206 for storing encoded data with respect to the encoding/decoding circuit 205. The use-condition of the buffer memories 206 is controlled by the system control unit 201. Being specified the compression encoding processing, the encoding/decoding circuit 205 reads out the image data stored in the image memory 202 one after another to perform the compression encoding processing thereto, and writes the encoded data into the specified buffer memory 206. Having performed the compression encoding processing in one buffer memory, the encoding/decoding circuit 205 transmits the fact to the system control unit 201. The system control unit 201, then, sends the encoded data stored in the buffer memory 206 to the recording/reproducing unit 52, where the encoded data is recorded in the optical disk 4.

Such processing as described above is repeated until all the compression encoding processing and recording operation of the image data in one page is finished. At this time, the system control unit 201 is adapted to be capable of simultaneously controlling another processing by using time sharing.

Next, the system control unit 201 sets the operation-state (d) to be in no operation (=0), and files the recording start address, the recorded data length and the attribute data such as size and resolution of data image when the recording operation is performed, and the retrieval data such as title and key word previously inputted therein, all into the retrieval file 207 through the retrieval data record unit 208. At last, the system control unit 201 sets the use-state (c) to be in no use (=0).

Now register processing from the terminal device B with respect to the optical disk filed in the main device A will be described below. The undescribed operation control in this register processing by using the auto-changer control file 211 and the operation control file 213 is performed in the same way as described above in the register processing in the main device A.

Having specified the register of the image data by the keyboard 17, the system control unit 121 requests the whole data of the optical disks 4 filed in the main device A with respect to the main device A through both the communication control unit 127 and communication line 20. This request is transmitted to the system control unit 201 of the main control unit 2 through the communication control unit 214. The system control unit 201, then, sends the whole data of the optical disk 4 filed in the main device A to the communication control unit 214, and further sends it to the terminal device B through the communication line 20. The whole data of the optical disk 4 received by the communication control unit 127 is, then, sent to the system control unit 121 so as to be stored in the display memory 123 in the form of display format. As a result, such a list of the optical disks 4 as shown in FIG. 5 is to be displayed on the CRT display 13 of the terminal device B.

The user of the terminal device B specifies the required optical disk 4 from the list displayed on the CRT display 13 by operating the mouse 18 or the keyboard 17. After the optical disk 4 is specified, the system control unit 121 receives the data on the retrieval-data-input screen (retrieval system data) from the main control unit 2 in the same way as described above and then displays such retrieval-data-input screen as shown in FIG. 6 on the CRT display 13. The user, then, inputs the retrieval data such as title and key word by operating the keyboard 17 or the mouse 18 so as to specify the execution of register.

After a start of the execution of register is specified, the system control unit 121 outputs both the inputted retrieval data and a request for register to the main control unit 2 through the communication control unit 127. Having received the request for register, the main control unit 2 performs such processing procedure as shown in FIG. 7 in the same way as the register processing therein. At this time, unless the use-state (c) of the required optical disk is in no use (Step S2:YES), if the required optical disk 4 is not being in the auto-disk-changer 5 (Step S5:NO), and if there is no recording/reproducing unit 52 not being operated (Step S15:YES), the main control unit 2 delivers that fact to the terminal device B. Having received the fact, the system control unit 121 of the terminal device B displays it on the CRT display 13 so as to finish the register processing.

After preparation for recording operation has finished, the system control unit 201 transmits the fact to the terminal device B. The system control unit 121, then, specifies a start of compression encoding processing of image data with respect to the encoding/decoding circuit 125. At this time, it also specifies address of the buffer memory 126 for storing encoded data with respect to the encoding/decoding circuit 125. The use-condition of the buffer memory 126 is controlled by the system control unit 121. Being specified the compression encoding processing, the encoding/decoding circuit 125 reads out the image data stored in the image memory 122 one after another so as to perform the compression encoding processing thereto, and writes the encoded data into the specified buffer memory 126. Having performed the compression encoding processing in one buffer memory, the encoding/decoding circuit 125 transmits the fact to the system control unit 121. The system control unit 121, then, transmits the encoded data in the buffer memory 126 to the main control unit 2 through the communication control unit 127.

Until the compression encoding processing and the transmission processing of the image data in one page is finished, such processing as described above is repeated.

In the main control unit 2, the encoded data transmitted from the terminal device B through the communication control unit 214 is received in the buffer memory 206 specified by the system control unit 201, and having received the encoded data in one buffer memory, which fact is transmitted to the system control unit 201. The system control unit 201, then, sends the encoded data stored in the buffer memory 206 to the recording/reproducing unit 52, where the encoded data is recorded in the optical disk 4.

Such processing as described above is repeated until the receiving operation and recording operation of the image data in one page is finished.

All the encoded data is transmitted from the terminal device B, which fact is delivered to the main control unit 2. The system control unit 201, then, writes the relevant data into the auto-changer control file 211, the operation control file 213, and the retrieval file 207, and transmits a finish of the register processing to the terminal device B.

Now reading-out processing of image data in the main device A will be referred to below.

When reading-out processing of image data is specified by the keyboard 7, the system control unit 201 displays the list of the optical disks on the CRT display 3 in the same way as the register processing. When the user selects the required optical disk by operating the keyboard 7, the system control unit 201 displays the retrieval-condition-input screen on the CRT display 3. The user, then, inputs the retrieval condition such as title and key word by operating the keyboard 7 so as to specify the execution of retrieval. After the execution of retrieval is specified, the system control unit 201 reproduces the retrieval file 207 through the retrieval data reproduction unit 209, retrieves the image data meeting the retrieval condition previously inputted, and then displays the list of the retrieved result on the CRT display 3. If there is no required image data in the list displayed on the CRT display 3, the same retrieval as described above is performed with varied retrieval condition. On the contrary, if there is the required image data, the user specifies the image data by operating the keyboard 7.

In the same way as in such register processing as described above, the system control unit 201 performs such processing as shown in FIG. 7 so as to prepare for reproducing operation of the encoded data stored in optical disk. However, in the case of this reading-out processing, (c)=1 or 2 ("in read-out registering") is changed to (c)=2 ("in registering") in Step S2, so is (c)←2 ("use-state←in registering") to (c)←1 ("use-state←in reading out") in Step S3 in FIG. 7, respectively. In other words, only when the optical disk 4 is not being registered, the reading-out processing is proceeded. At this time, the system control unit 201 updates both the content of auto-changer control file 211 and the operation control file 213 in the same way as in such register processing as described above.

The system control unit 201, from the retrieval file 207, reproduces the recording start address, the recorded data length and the attribute data of image data with respect to the optical disk 4 in which the encoded data is recorded, and according to them, it operates the recording/reproducing unit 52 in which the required optical disk is being set so as to read out the encoded data of image data from the optical disk 4 to the buffer memory 206. At this time, the reading-out operation is performed in one buffer memory unit, and at the time when the operation in one buffer memory is finished, the encoding/decoding circuit 205 is activated so that the image data being decoded by the encoding/decoding circuit 205 is stored in the image memory 202 one after another. When the encoding/decoding circuit 205 is activated, the system control unit 201 specifies the buffer memory 206 in which the encoded data is being stored with respect to the encoding/decoding circuit 205. Having performed the decode processing in one buffer memory, the encoding/decoding circuit 205 transmits the fact to the system control unit 201.

Such processing as described above is repeated until reading-out of the image data in one page is finished. At this time, the system control unit 201 is adapted to be capable of simultaneously controlling another processing by using time sharing. When reading-out of the image data in one page is finished, the use-state (c) is set in no use (=0) and the operation-state (d) is set in no operation (=0).

The image data stored in the image memory 202 is sent further to the display memory 203 so as to be displayed on the CRT display 3 by the display control unit 204.

Now will be described reading-out processing from the terminal device B with respect to the image data recorded in the optical disk filed in the main device A.

When a start of reading-out processing of image data is specified by the keyboard 17 in the terminal device B, in the same way as in register processing from the terminal device B, the whole data of optical disks 4 is requested to the main control unit 2 and the list of the optical disks 4 is displayed on the CRT display 13. When the user specifies the required optical disk 4 by operating the keyboard 17 and the like, the system control unit 121, in the same way as in register processing from the terminal device B, requests the data of retrieval-condition-input screen (retrieval system data) to the main control unit 2 so as to be displayed on the CRT display 13.

Having inputted retrieval condition such as title and key word, the user of the terminal device B specifies the execution of retrieval by operating the keyboard 17. After specifying the execution of retrieval, the system control unit 121 transmits both the retrieval condition and the request for retrieval to the main control unit 2 through the communication control unit 127. The request for retrieval is delivered to the system control unit 201 of the main control unit 2 through the communication line 20 and communication control unit 214. The system control unit 201, in the same way as such in retrieval processing as aforementioned, reproduces the retrieval data from the retrieval file 207 and then retrieves the image data meeting the received retrieval condition so as to transmit the retrieval result to the terminal device B through the communication control unit 214.

Having received the retrieved result, according to it, the system control unit 121 displays the list of the retrieved result on the CRT display 13. If there is no required image data in the list displayed on the CRT display 13, the same retrieval is performed with varied retrieval condition. On the other hand, if there is the required image data, the user specifies the image data by operating the keyboard 17.

The system control unit 121 transmits such numbers for identifying the specified image data as file number and page number to the main device A through the communication control unit 127 and communication line 20. The system control unit 201, in the same way as in reading-out in the main device A, prepares for reproducing operation and then transmits the preparation result to the terminal device B. At this time, when the preparation for reproducing operation is of normal termination, the system control unit 201 receives the recording start address, the recorded data length and the attribute data of the image data read out from the retrieval file 207, out of which the attribute data being sent to the terminal device B when the preparation result is transmitted. Having received the fact that reproducing operation can not be performed, the system control unit 121 of the terminal device B displays a message showing the fact on the CRT display 13 so as to finish the read-out processing.

When the preparation for reproducing operation is of normal termination, the system control unit 201 operates the recording/reproducing unit 52 being set in the required optical disk 4 according to the recording start address and recorded data length and then reads out the encoded data of the image data from the required optical disk 4 to the buffer memory 206. At this time, this reading-out operation is performed in one buffer memory unit, and at the time when reading-out operation in one buffer memory is finished, the read-out encoded data in the buffer memory 206 is transmitted to the terminal device B through the communication control unit 214.

Such processing is repeated until all the image data (encoded data) in one page is read out and transmitted, and after it being transmitted, which fact being transmitted to the terminal device B.

In the terminal device B, the buffer memory 126 specified by the system control unit 121 receives the encoded data sent from the main device A, and every time after receiving the encoded data in one buffer memory, which fact being transmitted to the system control unit 121. Having received the fact, the system control unit 121 activates the encoding/decoding circuit 125 so that it reads out the received encoded data in the buffer memory 126 one by one, and then performs decode processing for them so as to write the decoded data into the image memory 122. When the encoding/decoding circuit 125 is activated, the system control units 121 specifies the buffer memory 126 in which the encoded data is stored with respect to the encoding/decoding circuit 125, and every time after the encoder/decorder circuit performs decode processing of data in one buffer memory, the encoding/decoding circuit 125 delivers the fact to the system control unit 121.

Such processing as described above is repeated until the receiving and decode processing of image data in one page are finished.

The image data written in the image memory 122 is further sent to the display memory 123 so as to be displayed on the CRT display 13 by the display control unit 124.

Since the system control unit 201 is operated by using time sharing, unless there is generated such simultaneous processings as of the register and register or the register and reading-out with respect to the same recording medium (the same optical disk), aforementioned four processings are handled by multi-processing by each recording operation unit from one buffer memory 206 to optical disk or by each reproducing operation unit from optical disk to one buffer memory 206, thereby the user can simultaneously execute such processings as described above.

In this embodiment, there is provided in the main device the auto-disk-changer having the recording/reproducing unit, the stack unit and the carrier unit, and there is provided in the main control unit the auto-changer control unit for controlling both the setting condition in the recording/reproducing unit and the stack condition in the stack unit and the recording/reproducing operation control unit for controlling both whether the optical disk being set is performing recording/reproducing operation or not and whether the optical disk is being carried or not by the carrier unit, whereby, operations of both the recording/reproducing unit and the carrier unit are controlled. As a result, while the recording or reproducing operation for image data in one page is performed, the optical disk being in recording/reproducing is not liable to be returned because of another request for processing.

In addition, optical disks set in such recording reproducing units irrespective of carrying operation can always be accessed. Furthermore, another recording operation with respect to the optical disk being in recording by another request is not liable to be performed.

It goes without saying that the present invention is applicable to such any apparatus as provided with any terminal device performing duplex communication with a main device by communication means.

Figure 8:
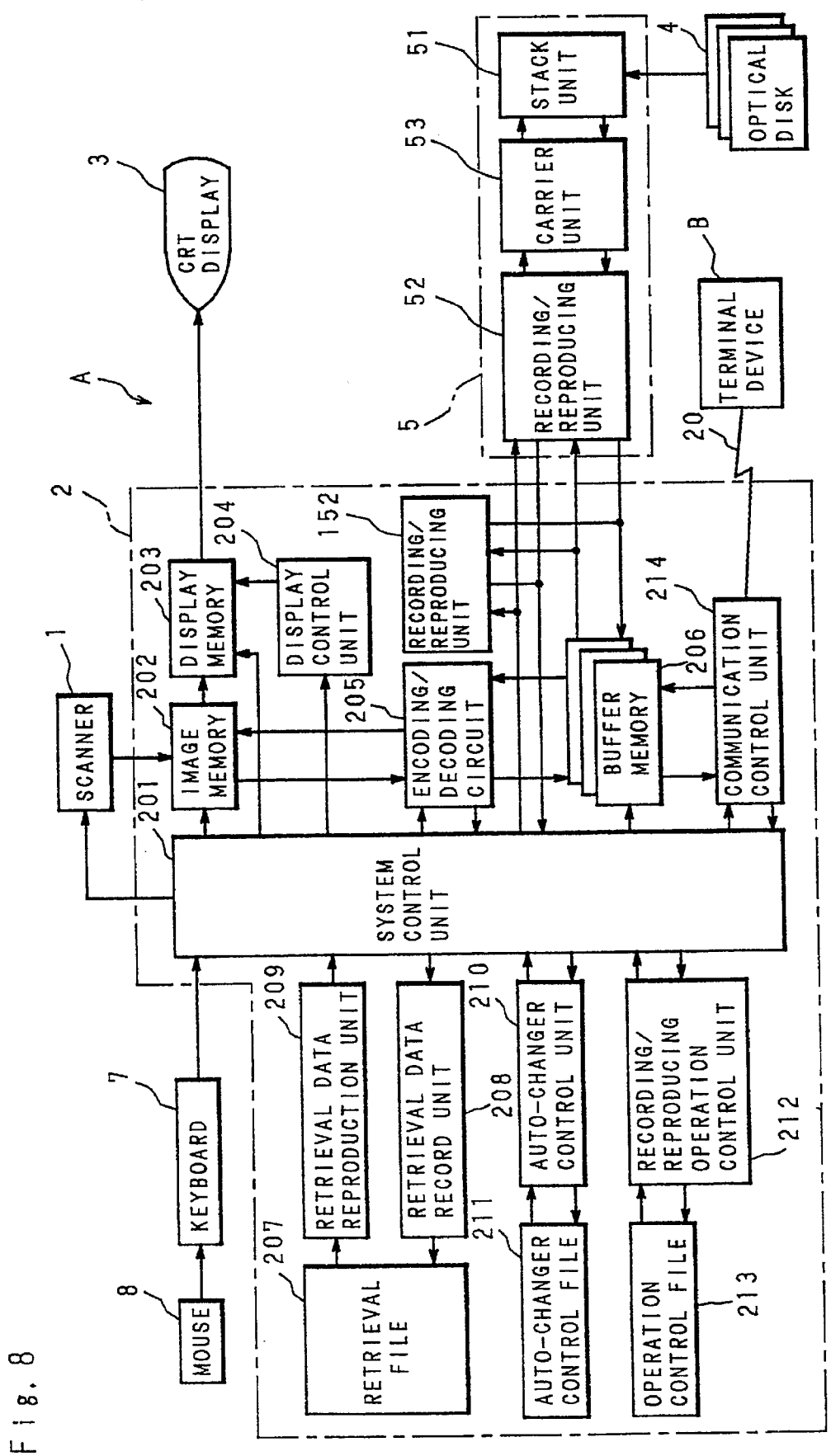
FIGS. 8, 9, and 11 are block diagrams showing the whole configuration of another embodiment of the invention.

Further in the embodiment of the invention, all the recording/reproducing units are set to be of auto-changer type, however, it may be adapted, for example, that one unit 152 of the recording/reproducing units is of manual exchanger type and all of the others 52 are of auto-changer type as shown in FIG. 8.

Now will be described two other examples of image data filing apparatus of the present invention which can make improvement in its prompt response to user's request. Those are of such a single image data filing apparatus as not being connected to a terminal device.

Figure 9:
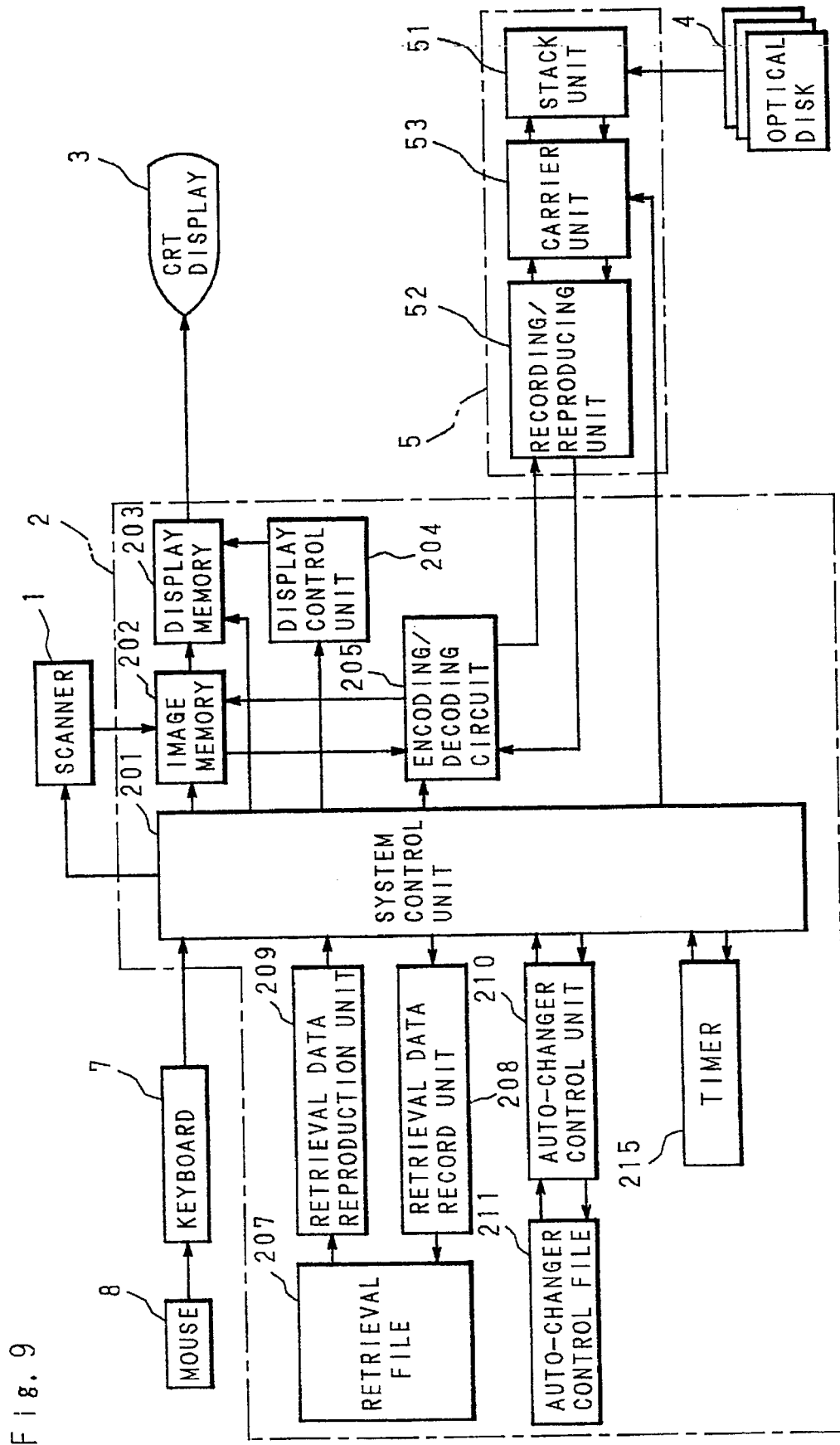
Figure 10:
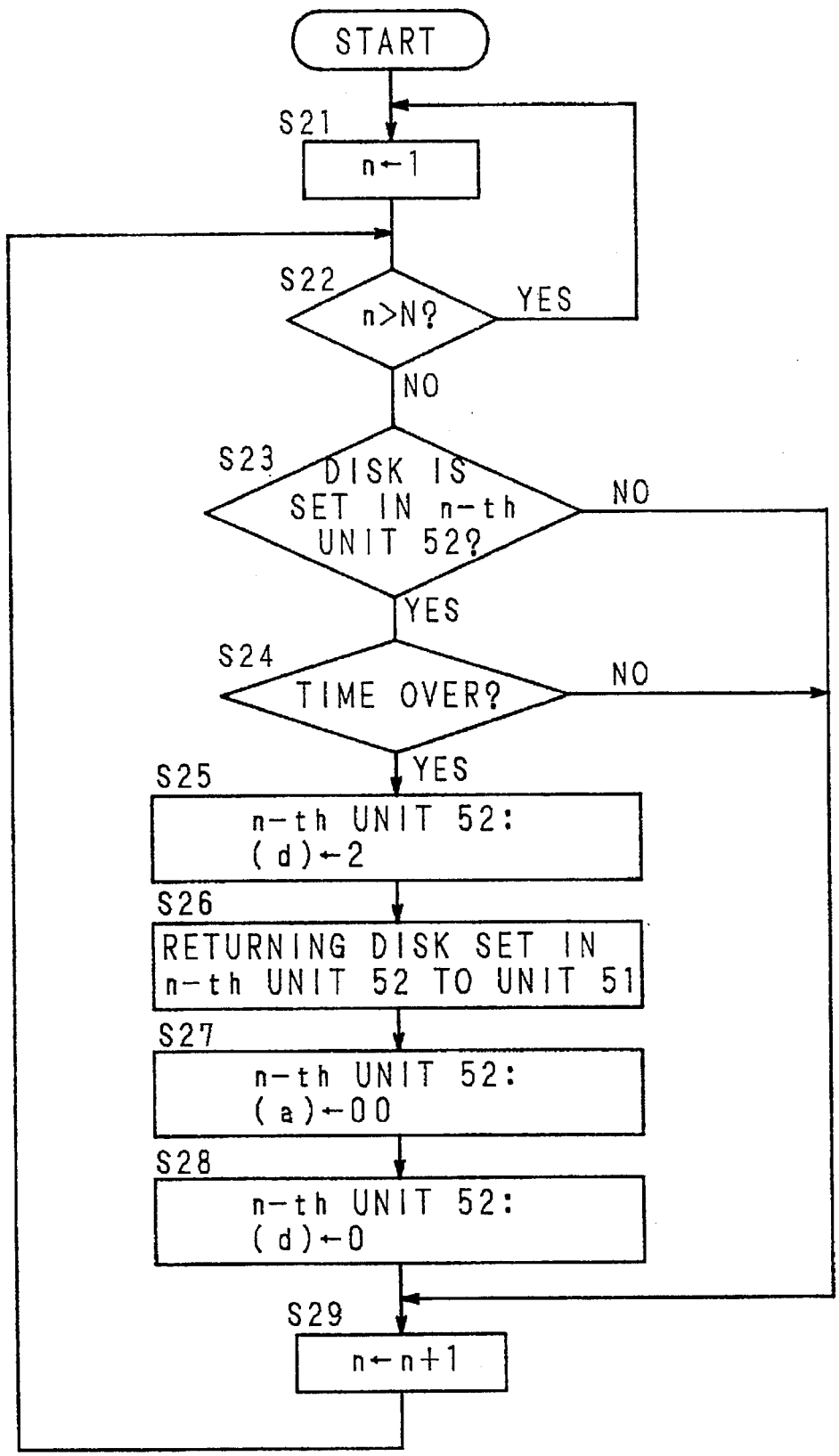
FIG. 10 is a flow chart showing functional operation in such an embodiment as illustrated in FIG. 9.

FIG. 9 is a block diagram showing an arrangement of one embodiment, wherein those elements numbered identically with the embodiment of FIG. 1 perform the same or similar functions. FIG. 10 is a flow chart showing operation of this embodiment. There is provided in the main control unit 2 N pieces of timer 215 which starts timing from the time when the N pieces of each recording/reproducing unit 52 finishes a recording operation or reproducing operation with respect to the optical disks 4 being set therein. When the optical disk 4 is set in the n-th ($1 \leq n \leq N$) recording/reproducing unit 52 (Step S23:YES) and the predetermined time (10 minutes, for example) has passed in the corresponding timer 215 (Step S24:YES), the fact that the predetermined time has passed is transmitted from the timer 215 to the system control unit 201. Having received the fact, the system control unit 201 sets the operation-state (d) in the n-th ($1 \leq n \leq N$) recording/reproducing unit 52 to be in carrying (=2) (Step S25), and then gives the carrier unit 53 a return command for the optical disk 4 set in the n-th recording/reproducing unit 52 so as to carry the optical disk 4 to the stack unit 51 (Step S26). Then setting condition (a) in the n-th recording/reproducing unit 52 is set to be not in setting (=00) (Step S27), and the operation-state (d) in the n-th recording/ reproducing unit 52 is set to be in no operation (=0) (Step S28). Such operations as described above are performed with respect to all the N pieces of recording/reproducing units 52 in the right order. In the embodiment, since an optical disk 4 that is not being recorded or reproduced for the predetermined time is returned automatically to the stack unit 51, unrequited optical disks 4 are not subject to be set in the recording/reproducing unit 52 for a long time and processings according to next requests can promptly be performed.

Figure 11:
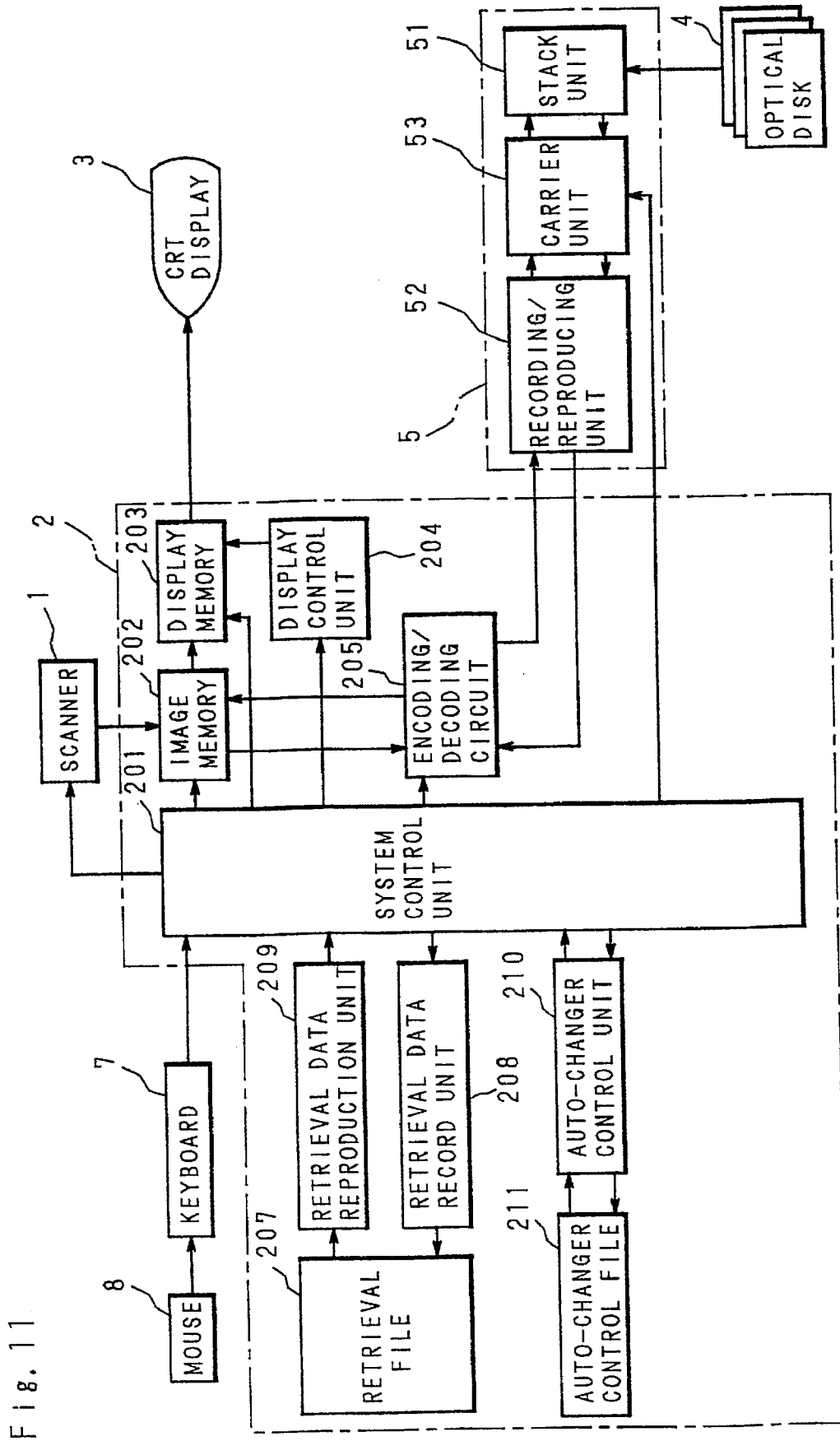
Figure 12:
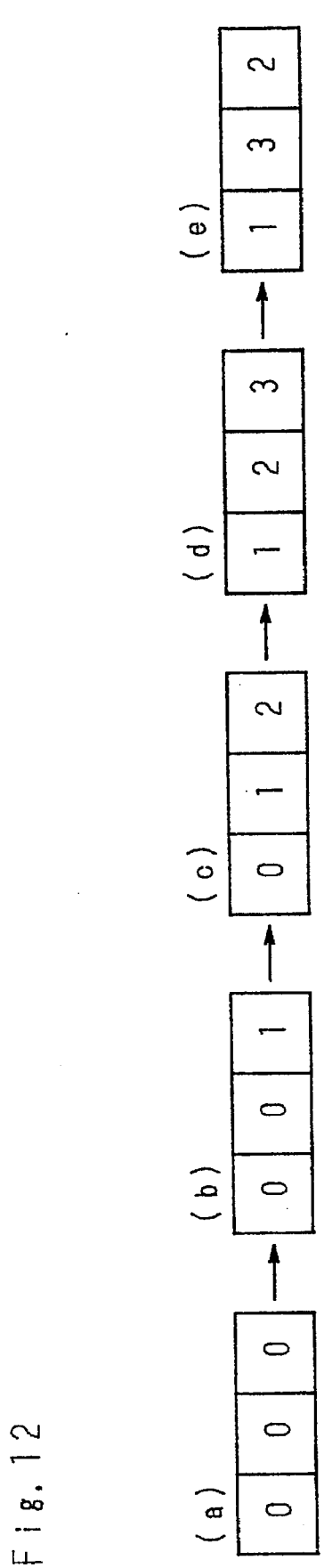
FIG. 12 is a schematic view showing one example of historical data of the auto-changer control file in such an embodiment as illustrated in FIG. 11.

FIG. 11 is a block diagram showing an arrangement of the other embodiment, wherein those elements numbered identically with the embodiment of FIG. 1 perform the same or similar functions. In this embodiment, the auto-changer control file 211 files historical data on operation of the recording/reproducing unit 52 in addition to both the setting condition of optical disk 4 in the recording/reproducing unit 52 and the stack condition of the optical disk 4 in the stack unit 51. FIG. 12 shows one example of the historical data in case of there being provided with three recording/reproducing units, in which initial value of each byte is set to be "0", and every time a recording or reproducing operation is performed, the number of such recording/reproducing unit 52 as has been used is written in the right-most byte and the number of such recording/reproducing unit 52 as was used last time is shifted to the left byte one by one. By filing such data, the recording/reproducing unit 52 having not formerly performed an access to a recording medium is specified and plural recording/reproducing units 52 can effectively be used.

In all the aforementioned embodiments, optical disks are used as recording media, however, other recording media such as a magnetic disk and a magneto-optic disk are similarly applicable.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the mets and bounds of the claims, or equivalence of such meets and bounds thereof are therefore intended to be embraced by the claims.

What is claimed is:

1. An image data filing apparatus, comprising:

a main device having a plurality of recording/reproducing units, each of said recording/reproducing units recording at least one of a plurality of image data of at least one of a plurality of documents to one of a plurality of recording media set therein and reproducing said image data from said one recording medium, said main device having media-changing means provided with a stack unit for stacking said recording media, and a carrier unit responsive to control means for performing a carrying operation of carrying one of the recording media between said stack unit and said recording/reproducing units;

a terminal device connected to said main device and communicating control data and said image data therebetween to cause said main device to perform at least one of recording said image data to a recording medium and reproducing said image data from a recording medium;

a plurality of buffer memories within said main device for temporarily storing said image data to be recorded in a recording medium or said image data reproduced from a recording medium;

said control means responsive to a first request from said main device and a second request from said terminal device within said main device for controlling the recording and reproducing of image data and simultaneously performing both of said first and second requests, said first and said second requests each causing said control means to perform one of transferring image data from said buffer memories to one of said recording/reproducing units and transferring image data from another of said recording/reproducing units to said buffer memories; and means for inhibiting a carry operation with respect to one of the recording media associated with one of said first and second requests while the recording media is already in use in connection with the other of said first and second requests, whereby one of said first and second requests does not interrupt the other of said first and second requests, said means for inhibiting controlled by said control means.

2. An image data filing apparatus as set forth in claim 1, further comprising:

first filing means within the main device and controlled by the control means for filing both the stack condition of recording media in said stack unit and the setting condition of recording medium in said recording/reproducing unit.

3. An image data filing apparatus as set forth in claim 1, further comprising:

second filing means within the main device and controlled by the control means for filing both the use-state of recording media and the operation-state of each recording/reproducing unit.

4. An image data filing apparatus as set forth in claim 1, wherein said main device is provided with automatic media-changing means and one manual media-changer.

5. An image data filing apparatus as set forth in claim 1, wherein said main device further has first filing means within the main device for filing the stack condition of recording media in said stack unit, and second filing means within the main device for filing the setting condition of any recording media in said recording/reproducing units whereby the control means will select the recording/reproducing unit in which one of said the recording media will next be set based on the conditions filed in the first and second filing means.

6. An image data filing apparatus as in claim 1 wherein said recording/reproducing units are responsive to said control means such that the transferring of image data with respect to one of said recording/reproducing units will be uninterrupted while a carry operation is performed with respect to another of said recording/reproducing units.

7. An image data filing apparatus as set forth in claim 1, wherein said main device further has timer means within the main device for detecting a time interval since the completion of transfer of image data with respect to the one of said recording media set in a particular recording/reproducing unit, and carrier control means within the main device and responsive to said timer means for controlling said carrier unit so that the one recording medium set in the particular recording/reproducing unit is returned to said stack unit, if said time interval exceeds a predetermined value.

8. An image data filing apparatus as in claim 5 wherein said control means is further responsive to said second filing means whereby when all of the recording/reproducing units contain one of said recording media and a recording/reproducing unit is needed for one of said recording media in said stack unit, a carry operation will be performed on the one of said recording media that has most formerly transferred image data with said buffer memories.

* * * * *